United States Patent [19]

Taguchi

[11] Patent Number: 5,257,507

[45] Date of Patent: Nov. 2, 1993

[54] AUTOMOTIVE AIR CONDITIONING SYSTEM HAVING REFRIGERANT COMPRESSOR WITH EXTERNALLY CONTROLLED VARIABLE DISPLACEMENT MECHANISM

[75] Inventor: Yukihiko Taguchi, Maebashi, Japan

[73] Assignee: Sanden Corporation, Gunma, Japan

[21] Appl. No.: 939,690

[22] Filed: Sep. 2, 1992

[30] Foreign Application Priority Data

Sep. 2, 1991 [JP] Japan .................. 3-246456
Sep. 2, 1991 [JP] Japan .................. 3-246457

[51] Int. Cl.$^5$ .............................................. B60H 3/04
[52] U.S. Cl. ...................................... 62/133; 62/228.5
[58] Field of Search ................ 62/133, 243, 244, 208, 62/209, 203, 323.1, 323.4, 228.1, 228.4, 228.5, 226, 227, 229; 165/43

[56] References Cited

U.S. PATENT DOCUMENTS

| | | | |
|---|---|---|---|
| 4,103,506 | 8/1978 | Adalbert et al. | 62/61 |
| 4,326,386 | 4/1982 | Tamura | 62/150 |
| 4,358,936 | 11/1982 | Ito et al. | 62/229 |
| 4,471,632 | 9/1984 | Nishi et al. | 62/208 |
| 4,485,635 | 12/1984 | Sakano | 62/209 |
| 4,510,764 | 4/1985 | Suzuki | 62/133 |
| 4,539,821 | 9/1985 | Tamura | 62/228.5 |
| 4,561,260 | 12/1985 | Nishi et al. | 62/133 |
| 4,582,124 | 4/1986 | Yoshimi et al. | 165/28 |
| 4,633,675 | 1/1987 | Sato | 62/208 |
| 4,796,438 | 1/1989 | Sato | 62/133 |
| 4,864,832 | 9/1989 | Suzuki | 62/228.5 X |
| 5,117,643 | 6/1992 | Sakurai et al. | 62/228.5 X |

FOREIGN PATENT DOCUMENTS 53-100546 2/1978 Japan .
56-112314 9/1981 Japan .

*Primary Examiner*—Harry B. Tanner
*Attorney, Agent, or Firm*—Baker & Botts

[57] ABSTRACT

An automotive air conditioning system for conditioning air in an automobile passenger compartment is disclosed. The automotive air conditioning system includes a compressor with an externally controlled variable displacement mechanism, a control apparatus for controlling operation of the compressor, an evaporator forming a part of the automotive air conditioning system, and an electromagnetic clutch associated with the compressor to intermittently transmit power from an engine of an automobile to the compressor. The control apparatus controls the operation of the compressor to quickly adequately compensate for reduction of the accelerating performance of the automobile without sacrificing adequate air conditioning in the automobile passenger compartment.

12 Claims, 9 Drawing Sheets

AUTOMOTIVE AIR CONDITIONING SYSTEM HAVING REFRIGERANT COMPRESSOR WITH EXTERNALLY CONTROLLED VARIABLE DISPLACEMENT MECHANISM

BACKGROUND OF THE INVENTION

1. Technical Field

The present invention relates to an automotive air conditioning system, and more particularly, to an automotive air conditioning system which includes a refrigerant compressor with an externally controlled variable displacement mechanism.

2. Description of the Prior Art

Generally, in an automotive air conditioning system, a refrigerant compressor is intermittently driven by an automobile engine through an electromagnetic clutch which is associated with the compressor in response to changes in the demand for air conditioning in an automobile passenger compartment so that the temperature of air in the auto passenger compartment is maintained at the required temperature. According to Japanese Patent Application Publication No. 55-148614, when the amount of demand for acceleration of the automobile is equal to or greater than a certain value, operation of the refrigerant compressor is stopped by means of deenergization of the electromagnetic clutch so that the power output from the automobile engine is effectively used for driving the automobile. However, this manner of stopping operation of the refrigerant compressor can cause inadequate air conditioning in the automobile passenger compartment because no air conditioning is carried out in the automobile passenger compartment due to the stopping of the operation of the refrigerant compressor.

In order to overcome this drawback, Japanese Patent Application Publication No. 57-195884 discloses an automobile air conditioning system which includes a refrigerant compressor with an externally controlled variable displacement mechanism. According to this Japanese Patent Application Publication, when the amount of demand for acceleration of the automobile is equal to or greater than a certain value, the capacity of the refrigerant compressor is forcibly reduced to the minimum displacement to produce extra power which is shared with driving the automobile. However, when the capacity of the refrigerant compressor is forcibly reduced to the minimum displacement in a smaller displacement stage, a negligible amount of extra power is produced and the air conditioning in the automobile passenger compartment is inadequately carried out. Therefore, when the amount of demand for acceleration of the automobile is equal to or greater than a certain value in the smaller compressor displacement stage, the capacity of the compressor is merely uselessly controlled. Furthermore, as shown in FIG. 1, when the capacity of the refrigerant compressor is forcibly reduced to the minimum displacement in a larger displacement stage, a sufficient amount of extra power cannot be instantly obtained in comparison with the stopping of the operation of the compressor by means of deenergization of the electromagnetic clutch as described above. Therefore, when the amount of demand for acceleration of the automobile is equal to or greater than a certain value in a larger compressor displacement stage, a reduction of the accelerating performance of the automobile due to operation of the compressor is not quickly adequately compensated.

SUMMARY OF THE INVENTION

Accordingly, it is an object of the present invention to provide an automotive air conditioning system which can quickly adequately compensate a reduction of the accelerating performance of an automobile without sacrificing adequate air conditioning in an automobile passenger compartment during operation of the automotive air conditioning system.

According to the present invention, an automotive air conditioning system includes a compressor with an externally controlled variable displacement mechanism, an evaporator forming a part of the automotive air conditioning system, a controlling mechanism for controlling operation of the compressor, and a transmitting mechanism, such as an electromagnetic clutch for intermittently transmitting power derived from an engine of an automobile to the compressor.

The controlling mechanism includes a first sensing mechanism for sensing a heat load of the evaporator, a second sensing mechanism, such as an acceleration pedal used by the automobile engine for sensing an amount of demand for acceleration of the automobile and a third sensing mechanism for sensing an amount of torque acting on a drive shaft of the compressor. The controlling mechanism further includes a first determining mechanism for determining whether the heat load on the evaporator is greater than a predetermined value, a second determining mechanism, such as a switching device associated with the acceleration pedal, for determining whether the amount of demand for acceleration of the automobile is equal to or greater than a predetermined value, and a third determining mechanism for determining whether the amount of torque acting on the drive shaft of the compressor is smaller than a second predetermined value, greater than a third predetermined value which is greater than the second predetermined value, or equal to or greater than the second predetermined value but equal to or smaller than the third predetermined value.

The controlling mechanism still further includes an operating mechanism for selectively operating the electromagnetic clutch and the externally controlled variable displacement mechanism in response to a determination of the first, second and third determining mechanisms.

An operating mechanism operates the externally controlled variable displacement mechanism to vary the capacity of the compressor from a minimum to a maximum value thereof. The operating mechanism further operates the electromagnetic clutch to prevent the transmission of power derived from the automobile engine to the compressor prior to the externally controlled variable displacement mechanism operating to vary the capacity of the compressor from the minimum to the maximum value thereof both when the amount of demand for acceleration of the automobile is equal to or greater than the first predetermined value and when the amount of torque acting on the drive shaft of the compressor is greater than the third predetermined value.

The operating mechanism further operates the externally controlled variable displacement mechanism to forcibly reduce the capacity of the compressor to the minimum value thereof prior to the externally controlled variable displacement mechanism operating to vary the capacity of the compressor from the minimum to the maximum value thereof both when the amount of demand for acceleration of the automobile is equal to or greater than the first predetermined value and when the amount of torque acting on the drive shaft of the compressor is equal to or greater than the second predetermined value but is equal to or small than the third predetermined value.

DETAILED DESCRIPTION OF THE PREFERRED EMBODIMENTS

Figure 1:
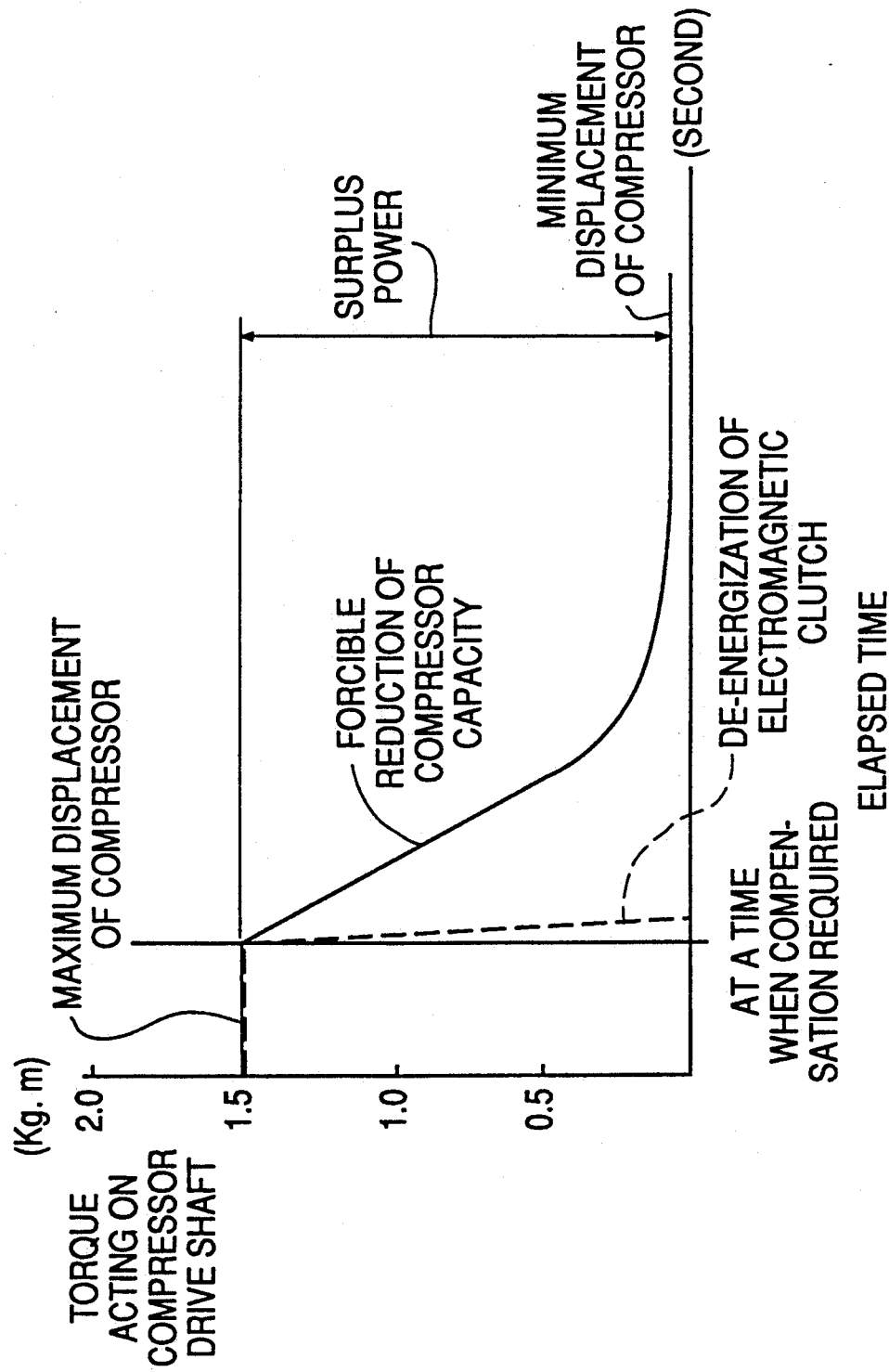
FIG. 1 is a graph illustrating an example of a prior art technique for compensating for a reduction of the acceleration performance of an automobile used with an automotive air conditioning system.
Figure 2:
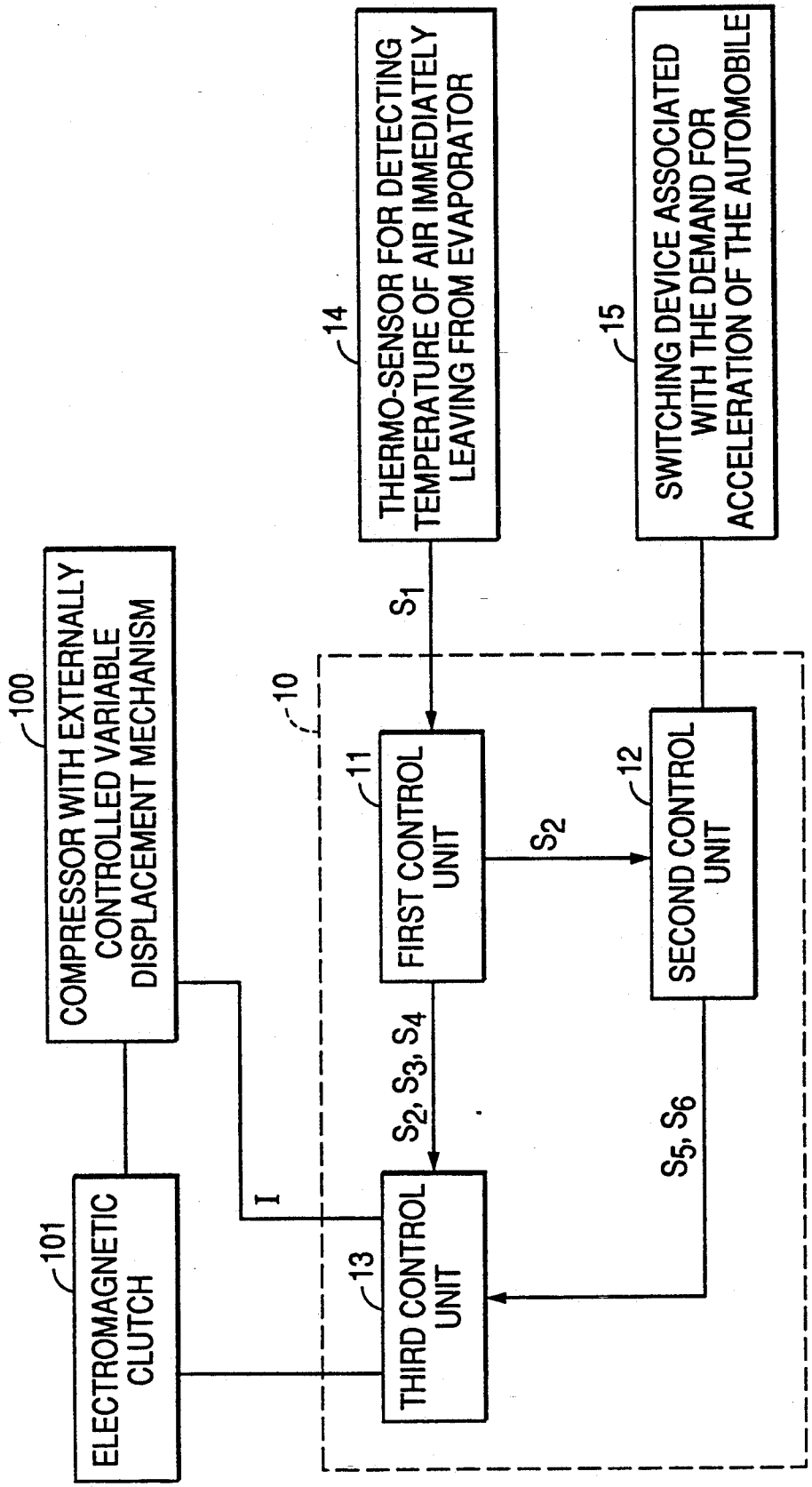
FIG. 2 is a partial schematic block diagram of an automotive air conditioning system in accordance with a first embodiment of the present invention.

FIG. 2 illustrates a partial schematic block diagram of an automotive air conditioning system in accordance with a first embodiment of the present invention. With reference to FIG. 2, the automotive air conditioning system includes refrigerant compressor 100 having a variable displacement mechanism such as the one disclosed in EP-A1-486257, and control apparatus 10 which controls operation of compressor 100. As disclosed in EP-A1-486257, the variable displacement mechanism of compressor 100 comprises an externally controlled valve device having a solenoid coil. The variable displacement mechanism of compressor 100 is described in detail in EP-A1-486257, therefore a further explanation thereof is omitted.

Control apparatus 10 includes first, second and third control units 11, 12, and 13. Thermo-sensor 14 detects the temperature T of air immediately leaving from an evaporator (not shown) which forms a part of the automotive air conditioning system, and is connected to first control unit 11. First control unit 11 is connected to both second and third control units 12 and 13. Second control unit 12 is also connected to third control unit 13. Third control unit 13 is connected to a solenoid coil of the externally controlled valve device of the variable displacement mechanism of compressor 100. Third control unit 13 is also connected to an electromagnetic coil of electromagnetic clutch 101 which is associated with and operatively connected to compressor 100 to intermittently transmit the rotational motion of an external power source, such as an automobile engine, to a drive shaft of compressor 100.

Thermo-sensor 14 generates first control signal S1 which represents the temperature T of air immediately leaving from the evaporator. First control signal S1 is provided to first control unit 11 from thermo-sensor 14 to be processed therein as follows.

First control unit 11 operates as a proportional-plus-integral controller to generate a proportional-plus-integral control signal as second control signal S2 which will be described in detail below. Second control signal S2 is provided to both second and third control units 12 and 13 from first control unit 11.

Third control unit 13 operates to process second control signal S2 to output electrical current I, the value of which varies from Imin (e.g. 0 ampere) to Imax (e.g. 1.0 ampere) in response to changes in the value of second control signal S2, to the solenoid coil of the externally controlled valve device of the variable displacement mechanism.

Figure 3:
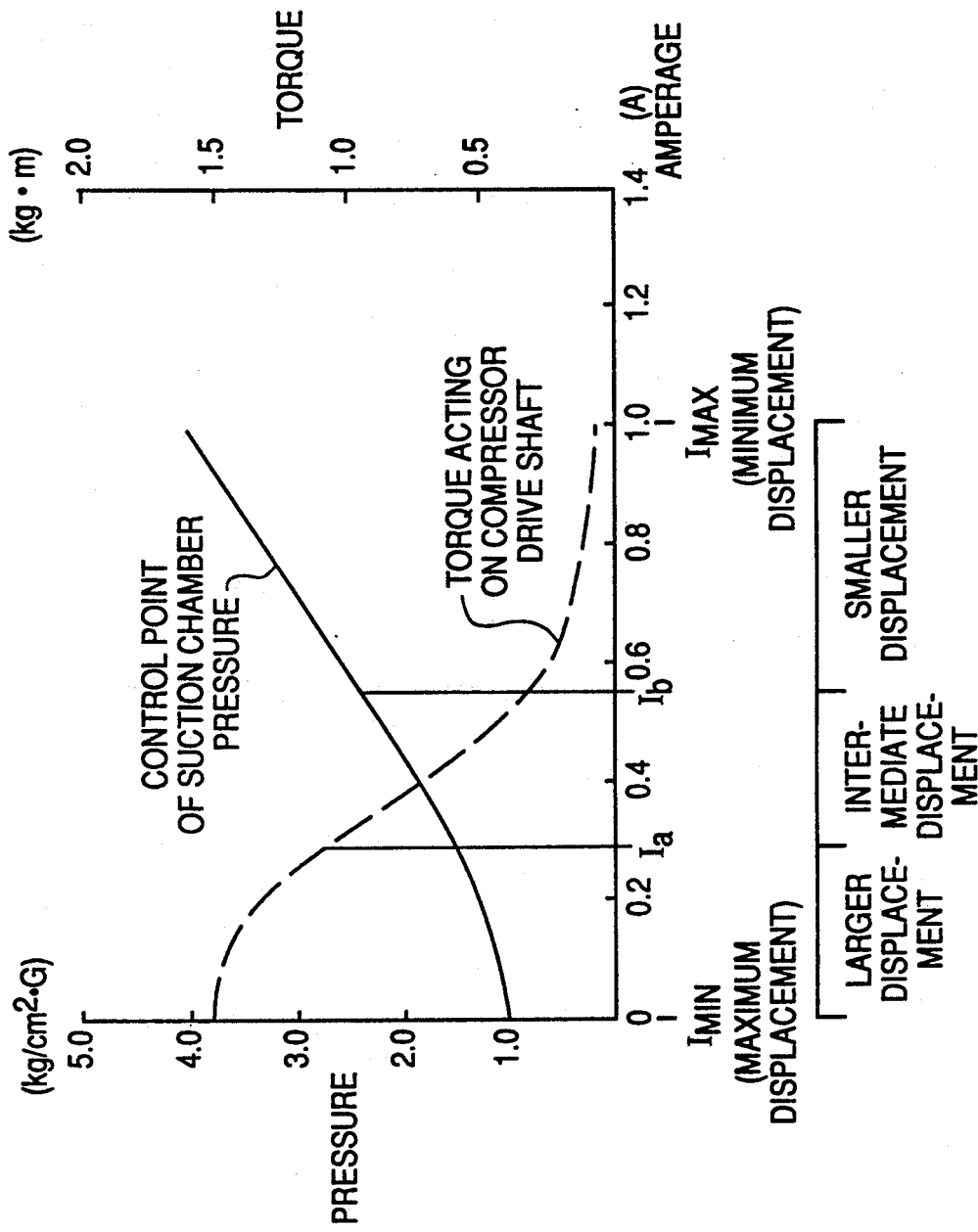
FIG. 3 is a graph illustrating relationships which are obtained by an operation of a compressor used in the automotive air conditioning system shown in FIG. 2.

FIG. 3 illustrates relationships which are obtained by an operation of compressor 100. When the externally controlled valve device of the variable displacement mechanism receives electric current I, when I has a value of Imax, the control point of pressure in the compressor suction chamber is maintained at a maximum value so that the compressor operates with minimum displacement. Therefore, the torque which acts on the compressor drive shaft is maintained at a minimum value. On the other hand, when the externally controlled valve device of the variable displacement mechanism receives electric current I, when I has a value of Imin, the control point of pressure in the compressor suction chamber is maintained at a minimum value so that the compressor operates with a maximum displacement. Therefore, the torque which acts on the compressor drive shaft is maintained at a maximum value. Furthermore, the control point of pressure in the compressor suction chamber varies from the maximum to minimum value thereof in response to the changes in electric current I as indicated by a solid line in FIG. 3. The torque acting on the compressor drive shaft varies from the maximum to minimum value thereof in response to changes in electric current I as indicated by a dashed line in FIG. 3. Accordingly, the capacity of compressor 100 can be controlled by changing the value of electric current I so that temperature T of air immediately leaving from the evaporator is maintained at the set temperature Tset.

First control unit 11 further operates as follows. When temperature T of air immediately leaving from the evaporator falls to or below a first predetermined value Ta at which frost begins to form on an exterior surface of the evaporator, first control signal S1 is processed in first control unit 11 to generate third control signal S3, which is sent to third control unit 13 to be processed therein to deenergize the electromagnetic coil of electromagnetic clutch 101. Therefore, operation of compressor 100 is stopped to prevent frost from forming on the exterior surface of the evaporator. Once third control signal S3 is generated in first control unit 11, deenergization of the electromagnetic coil of electromagnetic clutch 101 is maintained until the temperature T of the air immediately leaving from the evaporator rises to or above second predetermined value Tb which is greater than first predetermined value Ta. When the temperature T of the air immediately leaving from the evaporator rises above second predetermined value Tb, first control signal S1 is processed in first control unit 11 to generate fourth control signal S4, which is sent to third control unit 13 to be processed therein to energize the electromagnetic coil of electromagnetic clutch 101. Therefore, operation of compressor 100 is restarted. Accordingly, the electromagnetic coil of electromagnetic clutch 101 is energized and deenergized by the third and fourth control signals S4 and S3 generated at third control unit 13. Accordingly, the operation of compressor 100 is stopped and restarted by the respective third and fourth control signals S3 and S4 generated at third control unit 13.

Switching device 15 is associated with an acceleration pedal of an automobile, and is connected to second control unit 12. Switching device 15 is turned on to start operation of second control unit 12 when the amount of demand for acceleration of an automobile is equal to or greater than a certain value, that is, when the acceleration pedal is depressed by an amount equal to or greater than a certain amount. On the other hand, switching device 15 is turned off to stop operation of second control unit 12 when the amount of demand for acceleration of the automobile is less than the above-mentioned certain value, that is, when the acceleration pedal is depressed by less than the above-mentioned certain amount. Accordingly, second control unit 12 operates only when the amount of demand for acceleration of the automobile is equal to or greater than the certain value. Furthermore, operation of second control unit 12 overrides operation of first control unit 11. Alternatively, switching device 15 can be replaced with a pressure switch associated with an intake manifold used for the automobile engine, or a switching device associated with a throttling device used for the automobile engine.

Second control unit 12 operates to determine whether compressor 100 operates with a larger, an intermediate or a smaller displacement by means of processing second control signal S2 which is received from first control unit 11.

With reference again to FIG. 3, operation of second control unit 12 is as follows. When second control unit 12 determines that compressor 100 operates with a larger displacement, i.e., the solenoid coil of the externally controlled valve device of the variable displacement mechanism receives electric current I which has a value equal to or greater than Imin but is smaller than a predetermined value Ia, second control unit 12 generates fifth control signal S5. Fifth control signal S5 is provided to third control unit 13 from second control unit 12, and is processed therein to deenergize the electromagnetic coil of electromagnetic clutch 101. When second control unit 12 determines that compressor 100 operates with an intermediate displacement, i.e., the solenoid coil of the externally controlled valve device of the variable displacement mechanism receives electric current I which has a value equal to or greater than a predetermined value Ia but is equal to or smaller than another predetermined value Ib which is greater than Ia, second control unit 12 generates sixth control signal S6. Sixth control signal S6 is sent to third control unit 13 from second control unit 12, and is processed therein to output electric current I which has a value Imax to the solenoid coil of the externally controlled valve device of the variable displacement mechanism. Therefore, the capacity of compressor 100 is forcibly reduced to the minimum displacement. When second control unit 12 determines that compressor 100 operates with a smaller displacement, i.e., the solenoid coil of the externally controlled valve device of the variable displacement mechanism receives electric current I which has a value greater than Ib but is equal to or smaller than Imax, second control unit 12 generates no control signal. Therefore, the operation of control apparatus 10 is substantially implemented according to the operation of first control unit 11.

Figure 4:
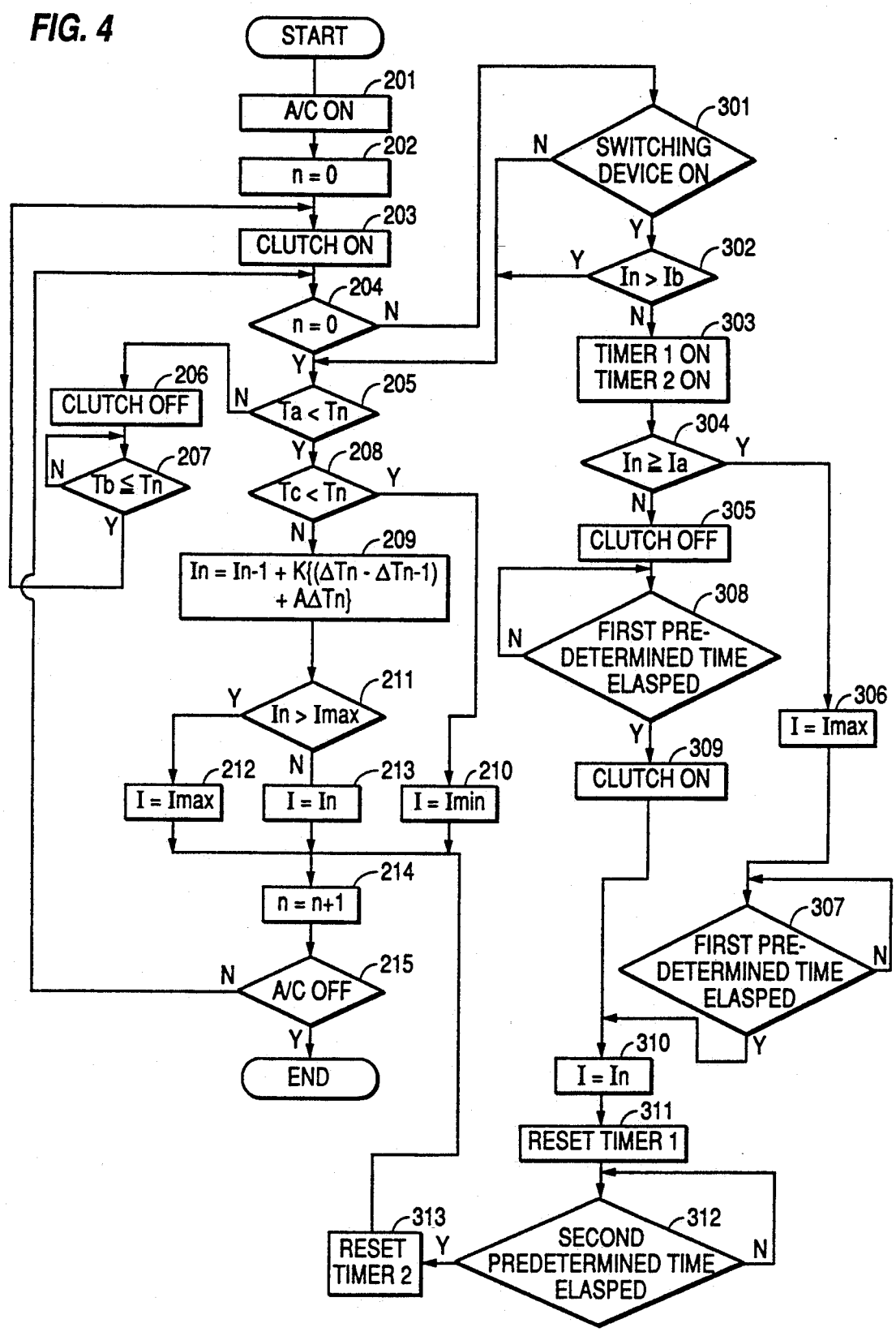
FIG. 4 is a flow chart of an operation of a control apparatus used in the automotive air conditioning system shown in FIG. 2.

With reference to FIG. 4, in addition to FIGS. 2 and 3, an operation of control apparatus 10 is now described. In FIG. 4, symbol "n" and the subscript "n" indicate the number of times the control apparatus 10 is operated after the automotive air conditioning system is turned on.

When the automotive air conditioning system is turned on (step 201), a counter (not shown) which is associated with control apparatus 10 is reset (step 202), and the electromagnetic coil of electromagnetic clutch 101 is energized (step 203) sequentially. Next, it is determined whether the number of the counter is zero (step 204). If the number of the counter is zero, that is, if the first operation of control apparatus 10 is not completed after the automotive air conditioning system is turned on, control passes to step 205. On the other hand, if the number of the counter is not zero, that is, if at least a first operation of control apparatus 10 has been completed after the automotive air conditioning system is turned on, control passes to step 301.

At step 205, it is determined whether the temperature Tn of the air immediately leaving the evaporator is higher than a first predetermined value Ta. If temperature Tn is higher than Ta, control passes to step 208. On the other hand, if temperature Tn is equal to or below Ta, control passes to step 206. At step 206, the electromagnetic coil of electromagnetic clutch 101 is deenergized to avoid frost forming on the exterior surface of the evaporator, and control passes to step 207. At step 207, it is determined whether temperature Tn is equal to or higher than second predetermined value Tb. If temperature Tn is equal to or higher than Tb, control passes back to step 203. On the other hand, if temperature Tn is below Tb, the deenergization of the electromagnetic coil of electromagnetic coil 101 is maintained.

At step 208, it is determined whether the temperature Tn of the air immediately leaving the evaporator is higher than a third predetermined value Tc. If temperature Tn is higher than Tc, control passes to step 210. On the other hand, if temperature Tn is equal to or below Tc, control passes to step 209. At step 209, second control signal S2, which is indicated, by example, as a form of electric current I which is output from third control unit 13 to the solenoid coil of the externally controlled valve device of the variable displacement mechanism, is generated in accordance with the following formula.

$$In = In-1 + K\{(\Delta Tn - \Delta Tn-1) + A\Delta Tn\} \quad (1)$$

In formula (1), $\Delta Tn$ is (Tn−Tset), and K and A are constants. Furthermore, in the first operation of control apparatus 10, Imin and (Tc−Tset) are substituted for In−1 and $\Delta Tn-1$ in formula (1), respectively. Next, control passes to step 211 in which it is determined whether electric current In is greater than Imax. If In is greater than Imax, control passes to step 212. On the other hand, if In is equal to or smaller than Imax, control passes to step 213. At step 212, Imax is output from third control unit 13 to the solenoid coil of the externally controlled valve device of the variable displacement mechanism. At step 213, electric current In is output from third control unit 13 to the solenoid coil of the externally controlled valve device of the variable displacement mechanism. At step 210, Imin is output from third control unit 13 to the solenoid coil of the externally controlled valve device of the variable displacement mechanism.

At step 301, it is determined whether switching device 15 is turned on. If switching device 15 is turned on, control passes to step 302. On the other hand, if switching device 15 is not turned on, control passes to step 205. At step 302, it is determined whether In is greater than second predetermined value Ib. If In is greater than Ib, control passes to step 205. On the other hand, if In is equal to or smaller than Ib, control passes to step 303. At step 303, first and second timers are turned on and start to run. Next, it is determined whether In is greater than first predetermined value Ia (step 304). If In is equal to or greater than first predetermined value Ia, control passes to step 306. On the other hand, if In is smaller than Ia, control passes to step 305. At step 306, Imax is output from third control unit 13 to the solenoid coil of the externally controlled valve device of the variable displacement mechanism. Next, it is determined whether the first timer has reached a first predetermined time t1 (step 307). If the first timer has not reached t1, Imax is still output from third control unit 13 to the solenoid coil of the externally controlled valve device of the variable displacement mechanism. On the other hand, if the first timer has reached the first predetermined time t1, control passes to step 310.

At step 305, the electromagnetic coil of electromagnetic clutch 101 is deenergized. Then, it is determined whether the first timer has reached the first predetermined time t1 (step 308). If the first timer has not reached the first predetermined time t1, deenergization of the electromagnetic coil of electromagnetic clutch 101 is maintained. On the other hand, if the first timer has reached T1, control passes to step 309 at which the electromagnetic coil of electromagnetic clutch is energized again and control passes to step 310. At step 310, In is output from third control unit 13 to the solenoid coil of the externally controlled valve device of the variable displacement mechanism. Next, the first timer is reset (step 311). Then, it is determined whether the second timer has reached a second predetermined time t2 which is longer than the first predetermined time t1 (step 312). If the second timer has not reached the second predetermined time t2, In is still output from third control unit 13 to the solenoid coil of the externally controlled valve device of the variable displacement mechanism. On the other hand, if the second timer has reached the second predetermined time t2, the second timer is reset (step 313). From steps 212, 213, 210 and 313, control passes to step 214 where the number n of the counter is increased by one since the operation of control apparatus 10 is completed once. Then, it is determined whether the automotive air conditioning system is required to be turned off (step 215). If the automotive air conditioning system is required to be turned off, the automotive air conditioning system is turned off so that the operation thereof is terminated. On the other hand, if the automotive air conditioning system is not required to be turned off, control passes back to step 204 and the operation of control apparatus 10 is repeated.

As described above, each of the steps from step 205 to 212, 213 and 210 is carried out in accordance with the operation of first control unit 11. Steps 302 to 313 are carried out in accordance with the operation of second control unit 12.

Figure 5:
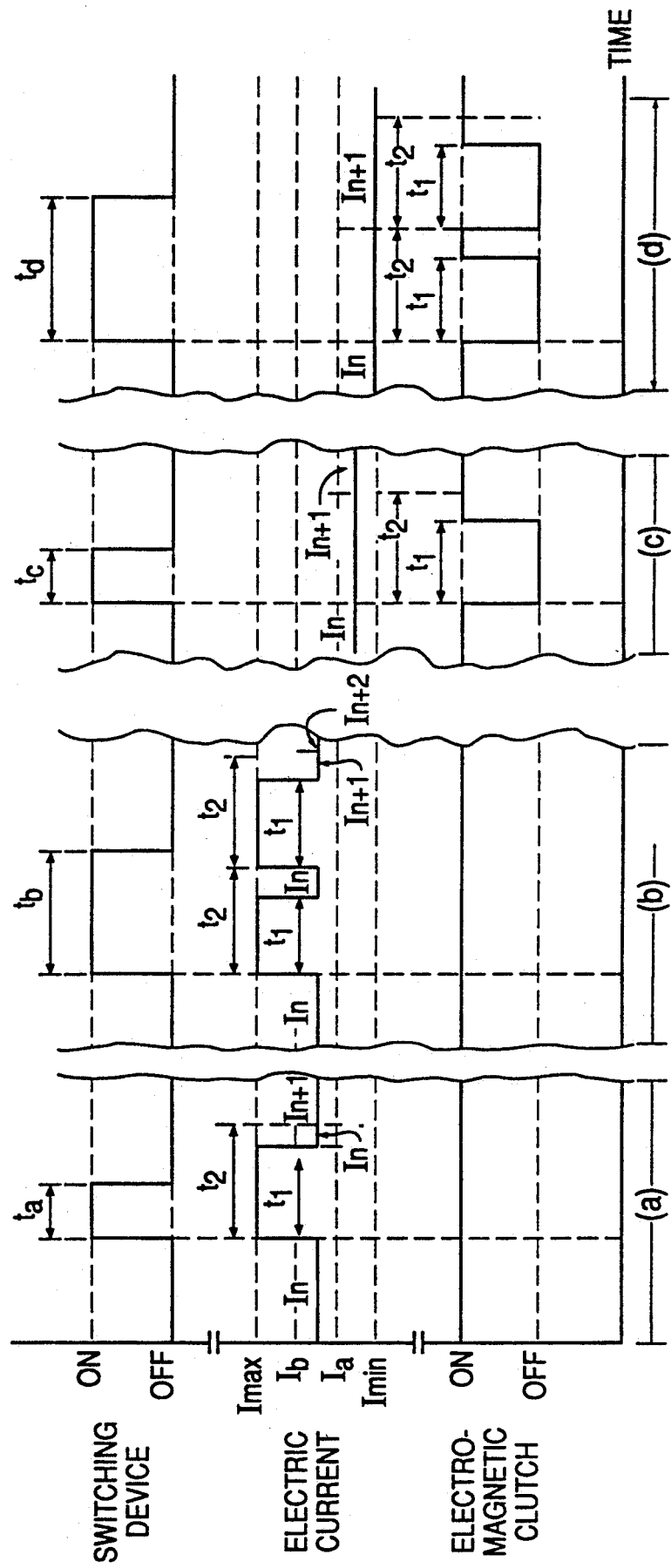
FIG. 5 is a partial time chart of an operation of a control apparatus used in the automotive air conditioning system shown in FIG. 2.

FIG. 5 is a time chart illustrating different operational stages of control apparatus 10. With reference to FIG. 5 in addition to FIG. 4, each of the steps from step 302 to step 313 via steps 306 and 307 in FIG. 4 is carried out in stages (a) and (b). The difference between stages (a) and (b) is the length of ON-time of switching device 15. In stage (a), the length ta of ON-time of switching device 15 is shorter than second predetermined time t2. Therefore, each of the steps from step 302 to step 313 via steps 306 and 307 in FIG. 4 is carried out only once in stage (a). On the other hand, in stage (b), the length tb of ON-time of switching device 15 is slightly longer than second predetermined time t2. Therefore, each of the steps from step 302 to step 313 via steps 306 and 307 in FIG. 4 is carried out more than once in stage (b).

Furthermore, each of the steps from step 302 to step 313 via steps 305, 308 and 309 in FIG. 4 is carried out in stages (c) and (d). The difference between stages (c) and (d) is the length of ON-time of switching device 15. In stage (c), the length tc of ON-time of switching device 15 is shorter than second predetermined time t2. Therefore, each of the steps from step 302 to step 313 via steps 305, 308 and 309 in FIG. 4 is carried out only once in stage (c). On the other hand, in stage (d), the length td of ON-time of switching device 15 is slightly longer than second predetermined time t2. Therefore, each of the steps from step 302 to step 313 via steps 305, 308 and 309 in FIG. 4 is carried out more than once in stage (d).

As described above, the automotive air conditioning system according to the first embodiment of the present invention can quickly adequately compensate a reduction of the accelerating performance of the automobile without sacrificing adequate air conditioning in the automobile passenger compartment during operation of the automotive air conditioning system.

Figure 6:
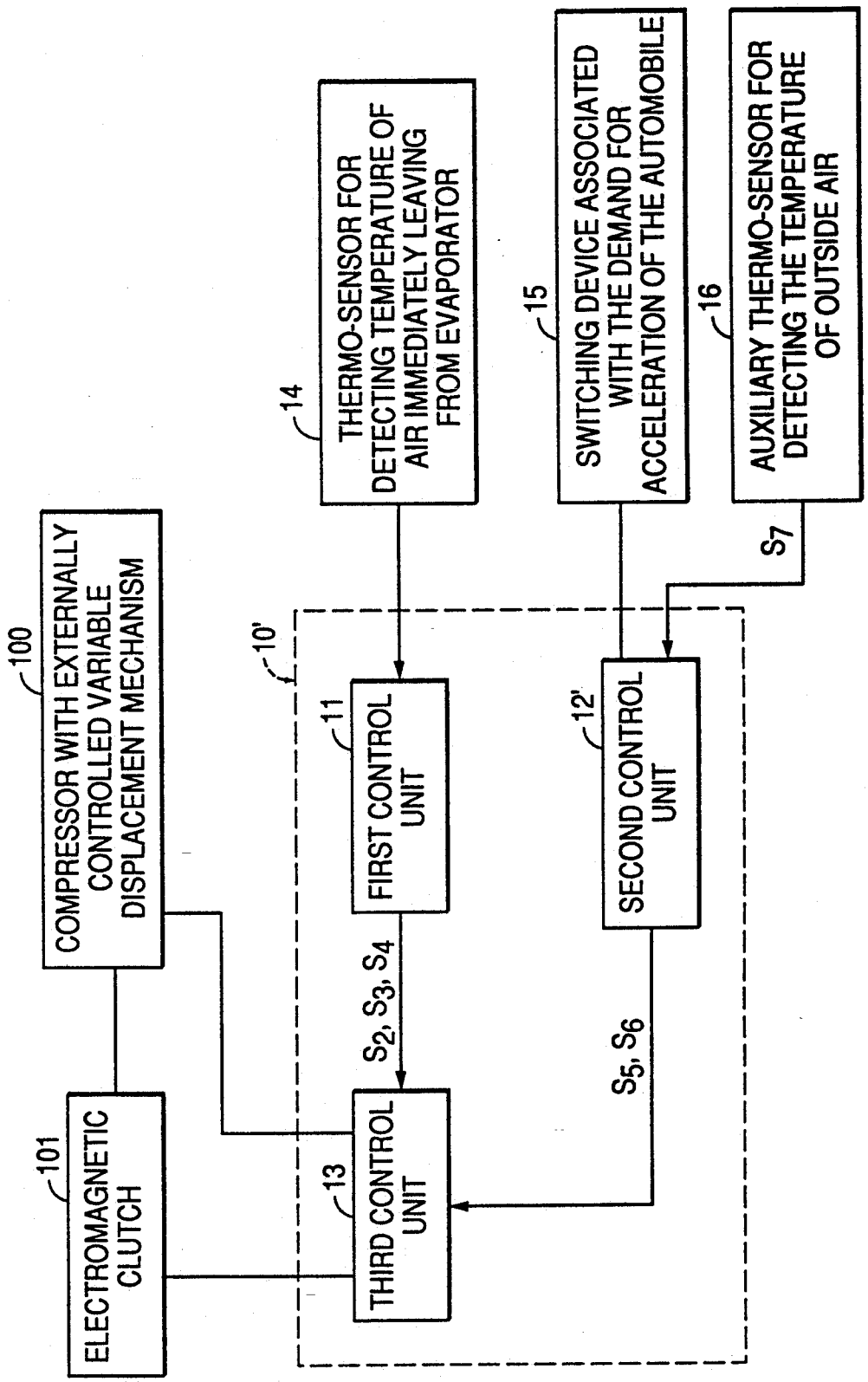
FIG. 6 is a partial schematic block diagram of an automotive air conditioning system in accordance with a second embodiment of the present invention.

FIG. 6 illustrates a partial schematic block diagram of an automotive air conditioning system in accordance with a second embodiment of the present invention. In FIG. 6, the same numerals are used to denote the corresponding elements shown in FIG. 2 so that an explanation thereof is omitted. In the second embodiment, control apparatus 10' includes second control unit 12' which is connected to both switching device 15 and auxiliary thermo-sensor 16. Auxiliary thermo-sensor 16 detects the temperature Ts of the air outside of an automobile, and generates seventh control signal S7 which represents the temperature Ts of the outside air. Seventh control signal S7 is sent to second control unit 12' from auxiliary thermo-sensor 16 to be processed therein.

Figure 7:
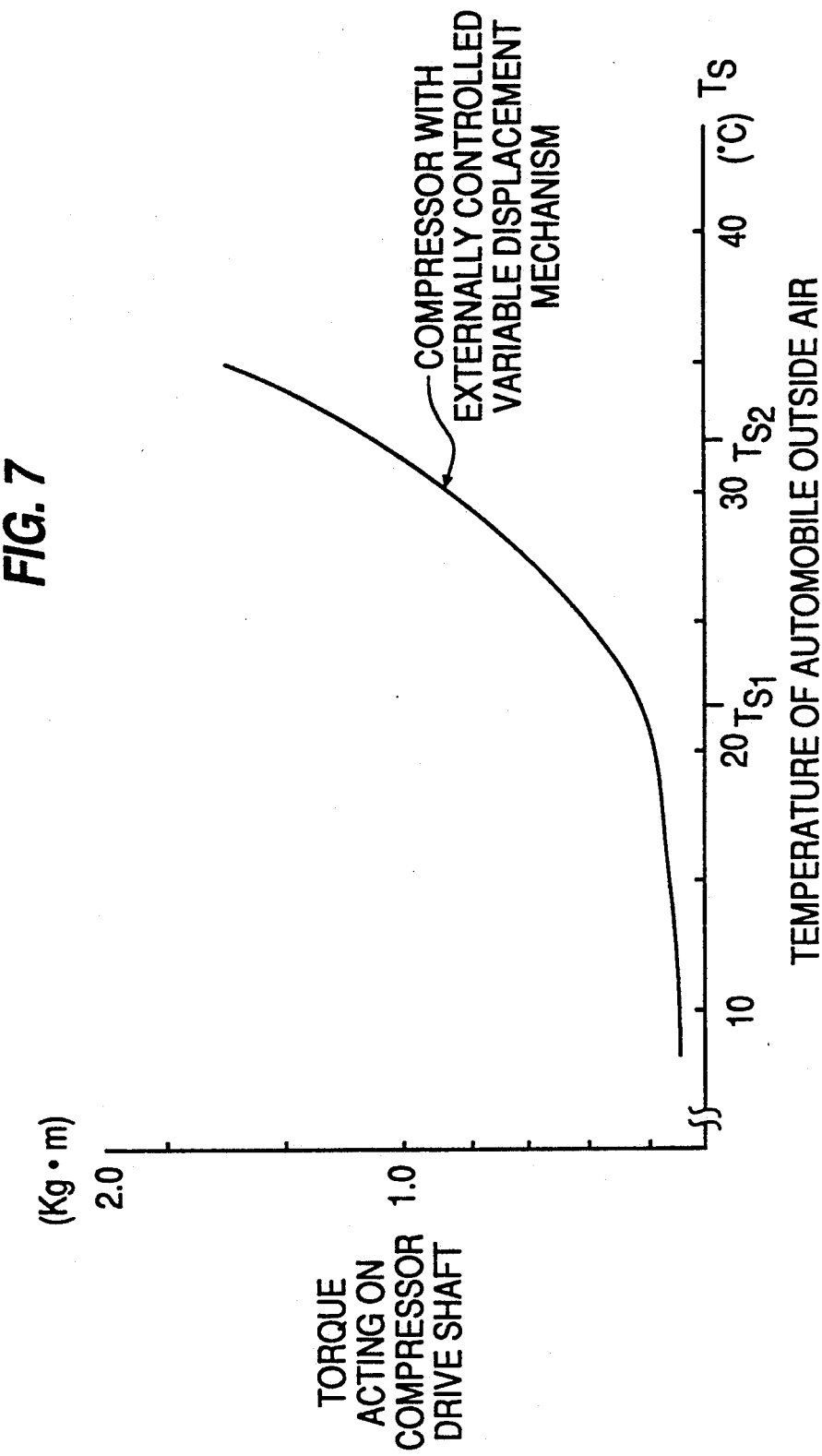
FIG. 7 is a graph illustrating a relationship obtained by an operation of the compressor used in the automotive air conditioning systems shown in FIGS. 2 and 6.

In the second embodiment, a relationship which is obtained by operation of compressor 100 and which is illustrated in FIG. 7 is utilized in the operation of control apparatus 10'. As illustrated in FIG. 7, when temperature Ts of the outside air is lower than first predetermined value Ts1, the amount of torque acting on the compressor drive shaft is small. On the other hand, when temperature T2 of the outside air is higher than second predetermined value Ts2, the amount of torque acting on the compressor drive shaft is large. Furthermore, when the temperature Ts of the automobile outside air is equal to or higher than first predetermined value Ts1 but is equal to or lower than second predetermined value Ts2, the amount of the torque acting on the compressor drive shaft is medium.

Second control until 12' operates to determine whether temperature Ts of the outside air is lower than first predetermined value Ts1, equal to or higher than first predetermined value Ts1 but equal to or lower than second predetermined value Ts2, or higher than second predetermined value Ts2, by means of processing seventh control signal S7 therein.

With reference again to FIG. 7, operation of second control unit 12' is as follows. When second control unit 12' determines that temperatures Ts of the outside air is lower than first predetermined value Ts1, second control unit 12' generates no control signal. Therefore, the operation of control apparatus 10' is substantially left up to the operation of first control unit 11. When second control unit 12' determines that temperature Ts of the outside air is higher than second predetermined value Ts2, second control unit 12' generates fifth control signal S5. Fifth control signal S5 is provided to third control unit 13 from second control unit 12', and is processed therein to deenergize the electromagnetic coil of electromagnetic clutch 101. When second control unit 12' determines that temperature Ts of outside air is equal to or higher than first predetermined value Ts1 but is equal to or lower than second predetermined value Ts2, second control unit 12' generates sixth control signal S6. Sixth control signal S6 is provided to third control unit 13 from second control unit 12', and is processed therein to output electric current I, which has a value Imax, to the solenoid coil of the externally controlled valve device of the variable displacement mechanism.

Figure 8:
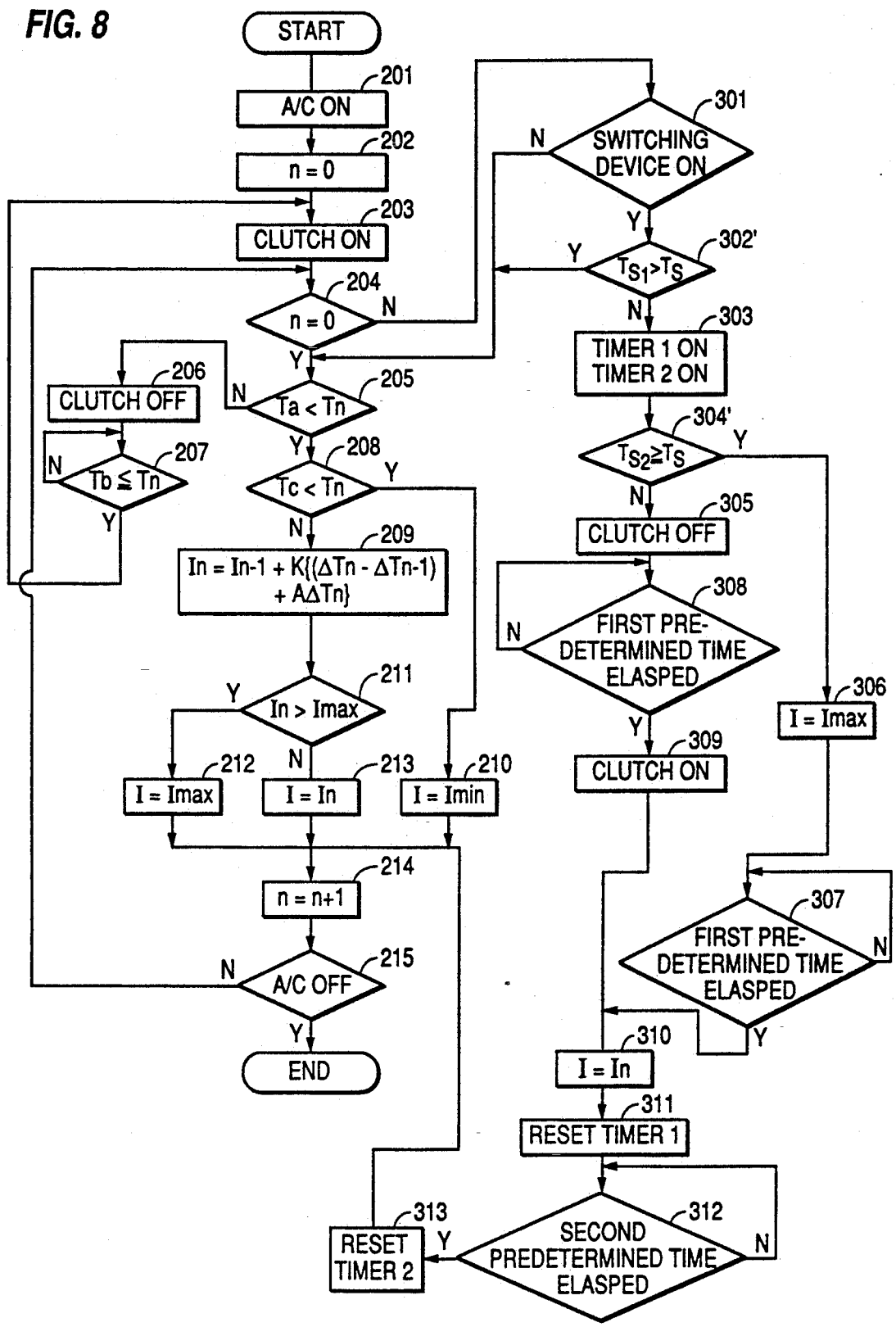
FIG. 8 is a flow chart of an operation of a control apparatus used in the automotive air conditioning system shown in FIG. 6.

FIG. 8 is a flow chart illustrating an operation of control apparatus 10'. A primary difference between FIG. 8 and FIG. 4 (which is a flow chart illustrating the operation of control apparatus 10 of the first embodiment) is that steps 302 and 304 in FIG. 4 are replaced with steps 302' and 304' in FIG. 8, respectively. At step 302' in FIG. 8, it is determined whether the temperature Ts of the outside air is lower than first predetermined value Ts1. At step 304' in FIG. 8, it is determined whether the temperature Ts of the outside air is equal to or lower than second predetermined value Ts2.

Figure 9:
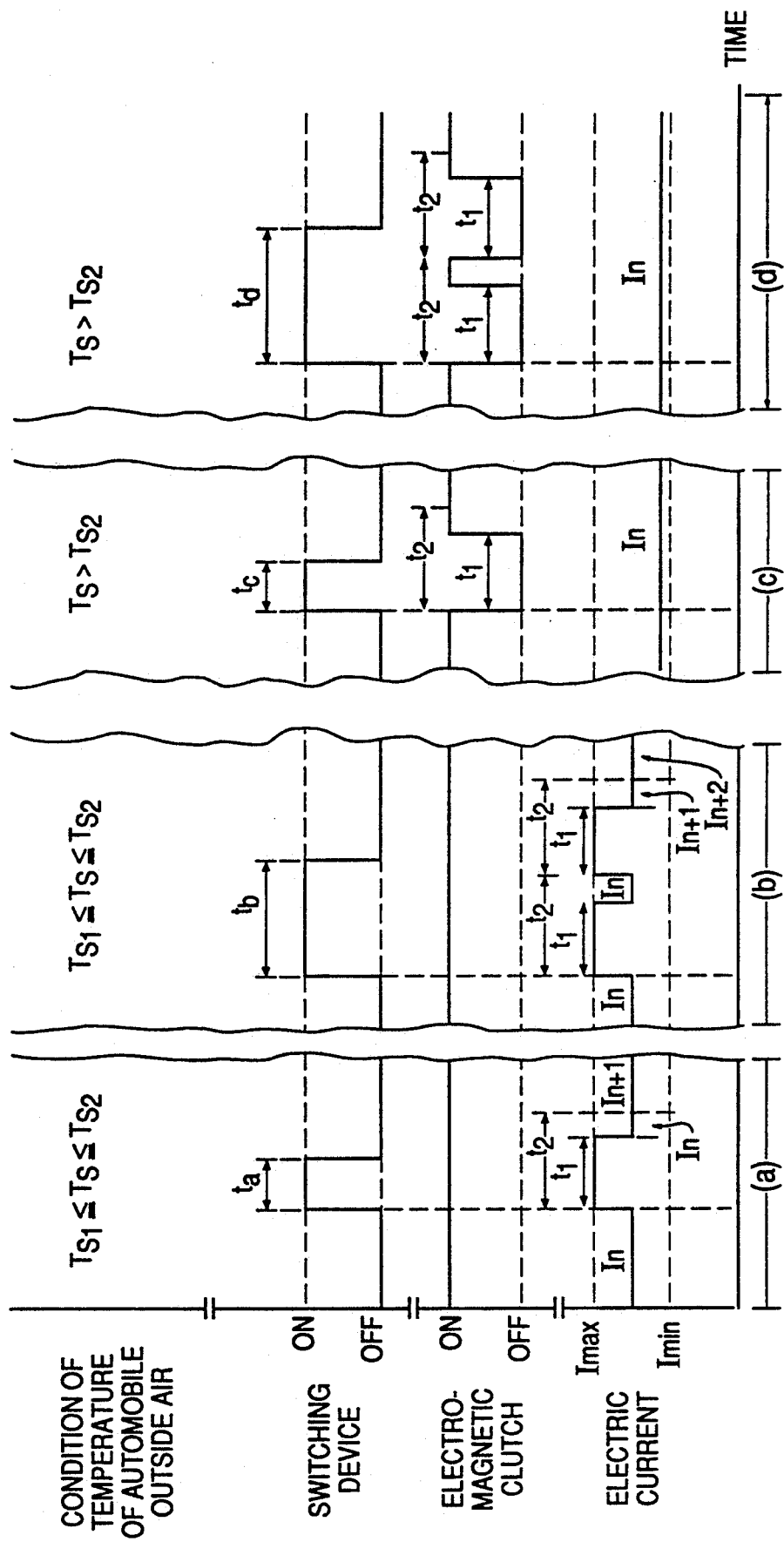
FIG. 9 is a partial time chart of an operation of a control apparatus used in the automotive air conditioning system shown in FIG. 6.

FIG. 9 is a time chart illustrating the different operational stages of control apparatus 10'. With reference to FIG. 9 in addition to FIG. 8, each of the steps from step 302' to step 313 via steps 307 and 307 in FIG. 8 is carried out in stages (a) and (b). The difference between stages (a) and (b) is the length of ON-time of switching device 15. In stage (a), the length ta of ON-time of switching device 15 is shorter than second predetermined time t2. Therefore, each of the steps from step 302' to step 313 via steps 306 and 307 in FIG. 8 is carried out only once in stage (a). On the other hand, in stage (b), the length tb of ON-time of switching device 15 is slightly longer than second predetermined time t2. Therefore, each of the steps from step 302' to step 313 via steps 306 and 307 in FIG. 8 is carried out more than once in stage (b).

Furthermore, each of the steps from step 302' to step 313 via steps 305, 308 and 309 in FIG. 8 is carried out in stages (c) and (d). The difference between stages (c) and (d) is the length of ON-time of switching device 15. In stage (c), the length tc of ON-time of switching device 15 is shorter than second predetermined time t2. Therefore, each of the steps from step 302' to step 313 via steps 305, 308 and 309 in FIG. 8 is carried out only once in stage (c). On the other hand, in stage (d), the length td of ON-time switching device 15 is slightly longer than second predetermined time t2. Therefore, each of the steps from step 302' to step 313 via steps 305, 308 and 309 in FIG. 8 is carried out more than once in stage (d).

The effect of the second embodiment is similar to the effect of the first embodiment.

This invention has been described in detail in connection with the preferred embodiments. These embodiments, however, are merely for example only and the invention is not restricted thereto. It will be understood by those skilled in the art that other variations and modifications can be easily made within the scope of this invention as defined by the appended claims.

I claim:

1. In an automotive air conditioning system including a compressor with a variable displacement mechanism, an evaporator forming a part of said automotive air conditioning system, controlling means for controlling operation of said compressor, and a transmitting means for intermittently transmitting power for moving an automobile to said compressor, said controlling means including;

first sensing means for sensing a heat load on said evaporator;

second sensing means for sensing an amount of demand for acceleration of said automobile;

third sensing means for sensing an amount of torque acting on a drive shaft of said compressor;

first determining means for determining whether said amount of demand for acceleration of said automobile is equal to or greater than a predetermined value of a first kind;

second determining means for determining whether said amount of said torque acting on said drive shaft of said compressor is smaller than a first predetermined value of a second kind, greater than a second predetermined value of said second kind where said second predetermined value is greater than said first predetermined value of said second kind, or equal to or greater than said first predetermined value of said second kind but equal to or smaller than said second predetermined amount of said second kind;

operating means for selectively operating said transmitting means and said variable displacement mechanism in response to a determination of said first, and second determining means;

said operating means operating said variable displacement mechanism so as to vary a capacity of said compressor from a minimum to a maximum value thereof in response to changes in said heat load on said evaporator when said amount of demand for acceleration of said automobile is smaller than said predetermined value of said first kind or when both said amount of demand for acceleration of said automobile is equal to or greater than said predetermined value of said first kind and said amount of said torque acting on said drive shaft of said compressor is smaller than said first predetermined value of said second kind;

said operating means operating said transmitting means to not transmit said power for moving said automobile to said compressor when both said amount of demand for acceleration of said automobile is equal to or greater than said predetermined value of said first kind and said amount of said torque acting on said drive shaft of said compressor is greater than said second predetermined value of said second kind;

said operating means further operating said variable displacement mechanism to forcibly reduce said capacity of said compressor to the minimum value thereof when both said amount of demand for acceleration of said automobile is equal to or greater than said predetermined value of said first kind and said amount of said torque acting on said drive shaft of said compressor is equal to or greater than said first predetermined value of said second kind but is equal to or smaller than said second predetermined value of said second kind.

2. The automotive air conditioning system of claim 1 wherein said first sensing means comprises a thermo-sensor for detecting the temperature of air immediately leaving from said evaporator.

3. The automotive air conditioning system of claim 1 wherein said automobile includes an engine from which said power for moving said automobile is derived.

4. The automotive air conditioning system of claim 3 wherein said second sensing means comprises an acceleration pedal used for said engine.

5. The automotive air conditioning system of claim 3 wherein said second determining means comprises a switching device associated with an acceleration pedal used for said engine.

6. The automotive air conditioning system of claim 3 wherein said second determining means comprises a pressure switch associated with an intake-manifold used for said engine.

7. The automotive air conditioning system of claim 3 wherein said second determining means comprises a switching device associated with a throttling device used for said engine.

8. The automotive air conditioning system of claim 1 wherein said third sensing means comprises a thermo-sensor for detecting the temperature of air immediately leaving from said evaporator.

9. The automotive air conditioning system of claim 1 wherein said third sensing means comprises a thermo-sensor for detecting the temperature outside of an automobile.

10. The automotive air conditioning system of claim 1 wherein said transmitting means comprises an electromagnetic clutch.

11. The automotive air conditioning system of claim 10 wherein said electromagnetic clutch includes an electromagnetic coil.

12. The automotive air conditioning system of claim 1 wherein said variable displacement mechanism includes an externally controlled valve device having a solenoid coil.

* * * * *